(12) United States Patent
Bouckaert et al.

(10) Patent No.: US 11,472,934 B2
(45) Date of Patent: Oct. 18, 2022

(54) ELASTOMERIC COMPOSITE POLYURETHANE SKINS

(71) Applicant: RECTICEL AUTOMOBILSYSTEME GMBH, Königswinter (DE)

(72) Inventors: Jean-Christophe Bouckaert, Wetteren (BE); Koen Vanlandschoot, Wetteren (BE)

(73) Assignee: RECTICEL AUTOMOBILSYSTEME GMBH, Königswinter (DE)

( * ) Notice: Subject to any disclaimer, the term of this patent is extended or adjusted under 35 U.S.C. 154(b) by 300 days.

(21) Appl. No.: 16/491,527

(22) PCT Filed: Apr. 27, 2018

(86) PCT No.: PCT/EP2018/060925
§ 371 (c)(1),
(2) Date: Sep. 5, 2019

(87) PCT Pub. No.: WO2018/197691
PCT Pub. Date: Nov. 1, 2018

(65) Prior Publication Data
US 2020/0032017 A1 Jan. 30, 2020

(30) Foreign Application Priority Data
Apr. 28, 2017 (EP) .................................. 17168750

(51) Int. Cl.
| | | |
|---|---|---|
| *C08J 5/18* | (2006.01) | |
| *C08J 7/04* | (2020.01) | |
| *B29C 41/00* | (2006.01) | |
| *B29C 41/08* | (2006.01) | |
| *B29C 41/22* | (2006.01) | |
| *C08G 18/32* | (2006.01) | |
| *C08G 18/48* | (2006.01) | |
| *C08G 18/66* | (2006.01) | |
| *C08G 18/75* | (2006.01) | |
| *C08G 18/76* | (2006.01) | |
| *C08G 18/22* | (2006.01) | |
| *C08L 75/08* | (2006.01) | |
| *B60R 13/02* | (2006.01) | |
| *C08G 18/12* | (2006.01) | |
| *C08G 18/24* | (2006.01) | |
| *B32B 27/40* | (2006.01) | |
| *B29K 75/00* | (2006.01) | |
| *B29L 31/30* | (2006.01) | |
| *B29L 9/00* | (2006.01) | |

(52) U.S. Cl.
CPC .............. *C08J 5/18* (2013.01); *B29C 41/003* (2013.01); *B29C 41/08* (2013.01); *B29C 41/22* (2013.01); *B32B 27/40* (2013.01); *B60R 13/02* (2013.01); *C08G 18/12* (2013.01); *C08G 18/227* (2013.01); *C08G 18/246* (2013.01); *C08G 18/3206* (2013.01); *C08G 18/3271* (2013.01); *C08G 18/3275* (2013.01); *C08G 18/4833* (2013.01); *C08G 18/4837* (2013.01); *C08G 18/6674* (2013.01); *C08G 18/6688* (2013.01); *C08G 18/755* (2013.01); *C08G 18/7671* (2013.01); *C08J 7/0427* (2020.01); *C08L 75/08* (2013.01); *B29K 2075/00* (2013.01); *B29L 2009/00* (2013.01); *B29L 2031/3005* (2013.01); *B29L 2031/3041* (2013.01); *B32B 2307/718* (2013.01); *C08J 2375/08* (2013.01); *C08J 2475/08* (2013.01); *C08L 2666/20* (2013.01)

(58) Field of Classification Search
CPC .... B60R 13/02; B32B 27/40; B32B 2307/718
See application file for complete search history.

(56) References Cited

U.S. PATENT DOCUMENTS

| | | | | |
|---|---|---|---|---|
| 6,242,555 B1 * | 6/2001 | Du Prez | ............... | C08G 18/22 524/718 |
| 2005/0101682 A1 * | 5/2005 | Bleys | ............... | C08G 18/4837 521/174 |
| 2013/0035466 A1 * | 2/2013 | Vanlandschoot | .. | C08G 18/6688 528/49 |

FOREIGN PATENT DOCUMENTS

| | | | |
|---|---|---|---|
| EP | 0379246 A2 * | 7/1990 | |
| WO | 2005000481 A1 | 1/2005 | |
| WO | 2007137623 A1 | 12/2007 | |

OTHER PUBLICATIONS

International Preliminary Report on Patentability dated Oct. 29, 2019, issued in corresponding International Application No. PCT/EP2018/060925, filed Apr. 27, 2018, 1 page.
(Continued)

*Primary Examiner* — Jasper Saberi
(74) *Attorney, Agent, or Firm* — Christensen O'Connor Johnson Kindness PLLC

(57) ABSTRACT

An elastomeric composite polyurethane skin having an average flexural modulus, measured in accordance with ASTM D790-03, smaller than 35 MPa is disclosed. The elastomeric composite polyurethane skin includes a first aliphatic polyurethane layer made from a first polyurethane reaction mixture having at least one isocyanate compound with at least two NCO-groups which are not directly attached to an aromatic group, at least one isocyanate-reactive component (B1), and at least one catalyst component (C1) substantially free of lead, and a second aromatic polyurethane layer made from a second polyurethane reaction mixture having at least one aromatic isocyanate compound (A2), and at least one isocyanate-reactive component (B2).

17 Claims, No Drawings

(56) References Cited

OTHER PUBLICATIONS

International Search Report dated Jul. 20, 2018, issued in corresponding International Application No. PCT/EP2018/060925, filed Apr. 27, 2018, 4 pages.
Written Opinion of the International Searching Authority dated Jul. 20, 2018, issued in corresponding International Application No. PCT/EP2018/060925, filed Apr. 27, 2018, 8 pages.

* cited by examiner

ELASTOMERIC COMPOSITE
POLYURETHANE SKINS

FIELD OF INVENTION

The present invention relates to elastomeric composite polyurethane skins comprising a first and second polyurethane layer which adhere to one another with reduced weights and high flexibility while maintaining the desired mechanical skin properties such as good tensile strength and good tear resistance. The present invention further relates to a method for the manufacturing of such elastomeric composite polyurethane skins.

BACKGROUND OF THE INVENTION

Polyurethane skins are used mainly in interior trim parts of automotive vehicles, more particularly in instrument panels, door panels, consoles, glove compartment covers, etc. The interior is one of the key differentiating factors in modern cars, wherein special attention is often paid to the tactile feel of the interior. Methods for manufacturing parts with a leather-touch surface must strike a balance between high quality, technical requirements and overall cost.

In the automotive industry, there is a growing demand for automotive parts which are characterised by having a minimal weight and thickness, high flexibility, no lead content, and low Volatile Organic Compound (VOC) emission levels. Furthermore, it is preferred that said parts do not require a coating layer to render the composite polyurethane skin light-stable.

Polyurethane reaction mixtures used to obtain elastomeric polyurethane skins for the automotive industry are for example The Colo-Fast® aliphatic polyurethane formulations (composed of a Polyfast® and an Isofast® blend: trademarks of Recticel), as notably disclosed in EP-B-0 379 246 and WO 2011/107605 A1. These compositions are based on aliphatic isocyanates which result in light-stable polyurethanes. Said light-stable polyurethanes do not require an in-mould coating (or a post-painting step) anymore, which is in general an additional step to avoid discoloration of the skin. Moreover, the skins produced with these formulations are able to build up a sufficient green strength within a relatively short cure time so that they can be removed from the mould surface without producing remaining deformations of the skin.

High flexibility is also important in automotive applications because polyurethane skins are typically adhered to a rigid substrate by means of an intermediate semi-rigid backfoam layer, situated between the elastomeric skin and the substrate. The presence of such backfoam layer enables to indent the polyurethane skin resiliently such that a soft touch is provided to the trim part.

A suitable method for producing a flexible elastomeric composite polyurethane skin having a flexural modulus smaller than 30 MPa, which is free of lead and which does not require a coating layer to render the composite polyurethane skin light-stable, is notably disclosed in WO 2007/137623 A1. Said composite polyurethane skin disclosed in WO 2007/137623 A1 comprises two polyurethane layers wherein the first layer is an aliphatic polyurethane layer and the second layer is an aromatic polyurethane layer. Said first aliphatic polyurethane layer being composed of components comprising at least an isocyanate component, isocyanate-reactive components and a catalyst component, which is free of lead, has a flexural modulus that is larger than the average flexural modulus but smaller than 35 MPa. The second aromatic polyurethane layer having a flexural modulus that is smaller than the average flexural modulus of the composite skin. However, the average areal weight of this composite polyurethane skin (determined by dividing the total mass of the skin by the surface area of its front surface) is still at least 0.6 kg/m$^2$ and the areal weight of the second aromatic polyurethane layer is larger than 0.3 kg/m$^2$.

Despite the efforts that have been directed to the development of flexible elastomeric composite polyurethane skin suitable for use in automotive applications, in particular in producing interior trim parts of automotive vehicles as mentioned above, there is still a need to provide flexible elastomeric composite polyurethane skins which are light in weight without any or substantially no loss of their desired mechanical properties in terms of their tensile strength and tear resistance, which are at the same time environment-friendly, e.g. having lower emission levels and which can be produced at a lower cost.

SUMMARY OF THE INVENTION

The inventors have now surprisingly found that it is possible to provide flexible elastomeric composite polyurethane skins fulfilling the above mentioned needs.

It is thus an object of the present invention to provide an elastomeric composite polyurethane skin having an average flexural modulus, measured in accordance with ASTM D790-03, smaller than 35 MPa; said elastomeric composite polyurethane skins comprising:
  a first aliphatic polyurethane layer made from a first polyurethane reaction mixture wherein said first polyurethane reaction mixture comprises at least one isocyanate compound (A1) having at least two NCO-groups which are not directly attached to an aromatic group, at least one isocyanate-reactive component (B1) and at least one catalyst component (C1) wherein the catalyst component (C1) is substantially free of lead,
  a second aromatic polyurethane layer made from a second polyurethane reaction mixture wherein said second polyurethane reaction mixture comprises at least one aromatic isocyanate compound (A2), and at least one isocyanate-reactive component (B2) characterised in that the elastomeric composite polyurethane skin has an average areal weight of equal to or less than 750 g/m$^2$ and the second aromatic polyurethane layer has a second average areal weight of less than 300 g/m$^2$.

It is a further object of the present invention to provide a method of producing said elastomeric composite polyurethane skin.

It is also a further object of the present invention to provide articles comprising said elastomeric composite polyurethane skin and the manufacturing thereof.

DETAILED DESCRIPTION OF THE INVENTION

Within the context of the present invention, the expression "average areal weight of the elastomeric composite polyurethane skin" is intended to refer to the sum of the average areal weight of the first aliphatic polyurethane layer [herein after, the first average areal weight] and the average areal weight of the second aromatic polyurethane layer [herein after, the second average areal weight].

Within the context of the present invention, the first average areal weight is calculated by multiplying the average density of the first aliphatic polyurethane layer by the average thickness of the first aliphatic polyurethane layer.

Within the context of the present invention, the second average areal weight is calculated by multiplying the average density of the second aromatic polyurethane layer by the average thickness of the second aromatic polyurethane layer.

Alternatively, these average areal weights can also be measured according to NBN ISO 2286-2 (2016).

It is essential that the elastomeric composite polyurethane skins of present invention are sufficiently flexible, i.e. having an average flexural modulus, measured in accordance with ASTM D790-03, of smaller than 35 MPa, preferably smaller than 30 MPa, more preferably smaller than 25 MPa and even more preferably smaller than 22 MPa.

It is known that the average flexural modulus of elastomeric composite polyurethane skins can be controlled by selecting the optimal ratio between the areal weight of the aliphatic polyurethane layer and the aromatic polyurethane layer, as notably described in WO 2007/137623 A1. However, in view of obtaining an increased flexibility for the composite polyurethane skins of WO 2007/137623 A1, it was essential that the areal weight of the aromatic polyurethane layer was at least 0.3 kg/m².

The Inventors have now surprisingly found that the elastomeric composite polyurethane skins of present invention characterised by having an average areal weight of less than 750 g/m² and moreover having an aromatic polyurethane layer having an areal weight of less than 0.3 kg/m² still possess good flexibility and still maintain the same superior material properties, e.g. good tensile strength and tear resistance of the prior art composite skins.

According to a preferred embodiment of the present invention, the elastomeric composite polyurethane skin of the present invention has an average areal weight of equal to or less than 700 g/m², preferably equal to or less than 680 g/m², more preferably equal to or less than 630 g/m², more preferably equal to or less than 600 g/m², more preferably equal to or less than 580 g/m².

As per the lower limit of the average areal weight of the elastomeric composite polyurethane skin, this is not particularly limited, provided that the elastomeric composite polyurethane skin has still the properties required for the particular field of use targeted, e.g. required high flexibility, as detailed above, and the desired mechanical skin properties such as tensile strength and tear resistance.

According to an advantageous embodiment of the present invention, the average areal weight of the elastomeric composite polyurethane skin is at least 700 g/m², preferably at least 650 g/m², more preferably at least 600 g/m², more preferably at least 550 g/m², even more preferably at least 500 g/m².

As said, it is also essential that the elastomeric composite polyurethane skin is characterised in that the second aromatic polyurethane layer has a second average areal weight of less than 300 g/m², preferably less than 270 g/m², preferably less than 250 g/m², preferably less than 220 g/m².

As per the lower limit of the second average areal weight of the second aromatic polyurethane layer, this is not particularly limited, provided that the elastomeric composite polyurethane skin has still the properties required for the particular field of use targeted.

According to an advantageous embodiment of the present invention, the second average areal weight of the second aromatic polyurethane layer of the elastomeric composite polyurethane skin is at least 150 g/m², preferably at least 200 g/m².

In view of the necessity that the elastomeric composite polyurethane skins of the present invention need to be sufficiently flexible, as detailed above, the average density of the second aromatic polyurethane layer of the elastomeric composite polyurethane skin is advantageously equal to or less than 550 kg/m³, preferably equal to or less than 500 kg/m³, more preferably equal to or less than 450 kg/m³, even more preferably equal to or less than 400 kg/m³.

As per the lower limit of the average density of the second aromatic polyurethane layer, this is not particularly limited, provided that the elastomeric composite polyurethane skin has still the properties required for the particular field of use targeted.

According to an advantageous embodiment of the present invention, the average density of the second aromatic polyurethane layer of the elastomeric composite polyurethane skin is at least 250 kg/m³, preferably at least 275 kg/m³, more preferably at least 300 kg/m³.

The inventors have found that an optimal choice of the nature and amounts of the reactive components in the second polyurethane reaction mixture, as detailed below, and use of optimal processing parameters in the manufacturing of the second aromatic polyurethane layer, in particular by further increasing the nitrogen level ($N_2$) during the spraying of the second aromatic polyurethane layer of the elastomeric composite polyurethane skin, as detailed below, allows achieving further reduction of the average density of the second aromatic polyurethane layer.

Provided that the second average areal weight of the second aromatic polyurethane layer of the elastomeric composite polyurethane skin is as defined above, the second aromatic polyurethane layer has advantageously an average thickness of at least 0.50 mm, preferably of at least 0.55 mm, more preferably of at least 0.60 mm and more preferably of at least 0.65 mm. On the other hand, the average thickness of the second aromatic polyurethane layer is preferably smaller than 1 mm, more preferably smaller than 0.9 mm and most preferably smaller than 0.8 mm.

The average density and the average thickness of a polyurethane layer can be measured according to known methods in the art.

The average density of a polyurethane layer is preferably measured according to ISO1183 (05-2012).

The average thickness of a polyurethane layer is preferably measured according to the standard method NBN EN ISO 2286-3 (2016).

According to an advantageous embodiment of the present invention, the first aliphatic polyurethane layer of the elastomeric composite polyurethane skin, as defined above, has an average density of at least 600 kg/m³, preferably of at least 700 kg/m³ and more preferably of at least 800 kg/m³.

As per the upper limit of the average density of the first aliphatic polyurethane layer, this is not particularly limited, provided that the elastomeric composite polyurethane skin has still the properties required for the particular field of use targeted.

According to an advantageous embodiment of the present invention, the average density of the first aliphatic polyurethane layer is advantageously equal to or less than 1400 kg/m³, preferably equal to or less than 1300 kg/m³, and more preferably equal to or less than 1200 kg/m³.

The inventors have found that an optimal choice of the nature and amounts of the reactive components in the first polyurethane reaction mixture and use of optimal processing parameters in the manufacturing of the first aliphatic polyurethane layer, as detailed below, allows achieving still thinner first aliphatic polyurethane layer having lower porosities. The inventors have surprisingly found that good mechanical properties in terms of good tensile strength and good tear resistance were nonetheless maintained.

According to an advantageous embodiment of the present invention, the first aliphatic polyurethane layer of the elastomeric composite polyurethane skin, as defined above, has an average thickness of equal to or less than 0.50 mm, preferably equal to or less than 0.45 mm and more preferably equal to or less than 0.40 mm. On the other hand, the average thickness of the first aliphatic polyurethane layer is preferably at least 0.1 mm, more preferably at least 0.2 mm and most preferably at least 0.3 mm.

According to an advantageous embodiment of the present invention, the first aliphatic polyurethane layer of the elastomeric composite polyurethane skin, as defined above, has a first average areal weight of at least 100 $g/m^2$, preferably at least 200 $g/m^2$, more preferably at least 250 $g/m^2$. On the other hand, the first average areal weight of the first aliphatic polyurethane layer is preferably less than 650 $g/m^2$, more preferably less than 600 $g/m^2$ and even more preferably less than 550 $g/m^2$.

As said, the first polyurethane reaction mixture comprises at least one isocyanate compound (A1) having at least two NCO-groups which are not directly attached to an aromatic group, at least one isocyanate-reactive component (B1) and at least one catalyst component (C1) wherein the catalyst component (C1) is substantially free of lead.

Within the context of the present invention, the expression "at least one isocyanate compound (A1)" is intended to denote one or more than one isocyanate compound (A1).

It is understood that the same applies for the expressions "at least one isocyanate-reactive component (B1)" and "at least one catalyst component (C1)".

An essential feature of the isocyanate compounds (A1) is that they comprise at least two NCO-groups which are not directly attached to an aromatic group. In this way, the obtained first aliphatic polyurethane layer can be made light-stable. Said isocyanate compound (A1) preferably comprises IPDI (isophorone-diisocyanate) monomers or trimers or a mixture thereof, the IPDI monomer/trimer mixture having preferably an NCO content of between 24.5 and 34% by weight. Optionally, an isocyanate prepolymer, wherein a portion of the NCO-groups has already reacted with an active hydrogen containing compound, can also be used as isocyanate compound (A1). Instead of IPDI other "non-aromatic" isocyanates can be used such as TMXDI, HDI, H6XDI and H12MD1 or derivatives thereof. These isocyanates are described in EP-B-0 379 246, which description is incorporated herein by way of reference.

The amount of the at least one isocyanate compound (A1) and the amount of the at least one isocyanate-reactive component (B1) is chosen in such a ratio with one another that the NCO-index of the first polyurethane reaction mixture is higher than 90, preferably higher than 95, more preferably higher than 100 and most preferably higher than 105, the NCO-index being preferably lower than 120. It has also been found that with such a high NCO-index, the "rubbery feel" of the skin can also be reduced.

According to an advantageous embodiment of the present invention, the at least one isocyanate-reactive component (B1) comprises:
- (b1) one or more active hydrogen containing compounds having: functional groups comprising hydroxyl, amine and/or thiol groups; a nominal functionality of from 2 to 8, preferably of from 2 to 4; and an equivalent weight of between 200 and 4000, preferably of between 800 and 2000;
- (b2) optionally, one or more active hydrogen containing flexibilisers which reduce the flexural modulus of the first aliphatic polyurethane layer, which have a molecular weight between 76 and 5000 and which contain only one isocyanate-reactive group which will react with an isocyanate group of the isocyanate compound (A1);
- (b3) one or more chain-extenders and/or crosslinkers having only hydroxyl groups as functional groups, at least 50% of which are primary hydroxyl groups, a functionality from 2 to 6; and
- (b4) one or more amine-initiators which form a co-catalytic system with catalyst component (C1), which have a functionality of 2 to 6 and an equivalent weight lower or equal to 200 and which comprise at least one aliphatic or alicyclic $NH_2$— or NH— group.

According to an advantageous embodiment of the present invention, the at least one isocyanate-reactive component (B1) comprises the one or more active hydrogen containing compounds (b1) in an amount from 60 to 95 parts by weight, preferably from 65 to 90 parts, more preferably from 70 to 85 parts, relative to 100 parts by weight of the isocyanate-reactive compounds (B1).

Preferred active hydrogen containing compounds (b1) are polyols, especially polyether polyols or polyester polyols including polyester polyols derived from natural oils. More preferred are polyoxyalkylene polyether polyols prepared by ring opening polymerization of oxiranes, especially from ethylene oxide, propylene oxide and butylene oxide and their mixtures. Most preferred are polyether polyols based on propylene oxide and optionally ethylene oxide with a molecular weight between 100 and 6000, an average hydroxyl functionality between 1.5 and 3.5, preferably between 1.9 and 2.1 and an oxypropylene content between 10 and 100% more preferably between 75 and 100%. The production of these polyols and the way to control their average equivalent weights and functionalities is well known in the art.

If present, according to a preferred embodiment of the present invention, the one or more flexibilisers (b2) are comprised in the at least one isocyanate-reactive component (B1) in an amount equal to or more than 1 part, preferably equal to or more than 2 parts, more preferably equal to or more than 3 parts, even more preferably equal to or more than 4 parts, relative to 100 parts by weight of the isocyanate-reactive compounds (B1). On the other hand, if present, the weight of flexibilisers (b2), relative to 100 parts by weight of the isocyanate-reactive compounds (B1), is preferably equal to or less than 15 parts, more preferably equal to or less than 10 parts, even more preferably equal to or less than 8 parts.

Thus, the flexibiliser (b2) comprises at least one isocyanate-reactive group which ensures that the flexibiliser (b2) is covalently incorporated in the polyurethane network. The most suitable flexibilisers (b2) comprise only one isocyanate-reactive group. Other flexibilisers (b2) may however contain one or more further isocyanate-reactive groups, which do substantially not participate in the formation of the polyurethane network, for example due to steric hindrance.

The flexibiliser (b2) may comprise alkoxylated alcohols, in particular alkoxylated terpene alcohols as disclosed in U.S. Pat. No. 4,383,050, mono-amines such as octyl amine, stearylamine, N-methylstearylamine, pyrrolidine, piperidine or cyclohexylamine, and mono alcohols like 2-ethylhexanol, octanol, dodecanol, stearylalcohol, the various amyl alcohols, cyclohexanol, etc.

At least one of the used flexibiliser (b2) preferably contains a polyether chain comprising ethylene oxide, propylene oxide or tetramethylene oxide units, or a mixture of two or more of these units in a mixed, blocked or random sequence. The flexibiliser (b2) more preferably comprises preferably a monoalkylether of polyethylene glycol, polypropylene glycol or poly(tetramethylene ether) glycol. Most preferred flexibiliser (b2) comprises a monoalkylether of polyethylene glycol.

As used herein the expression "molecular weight" refers to the number-average molecular weight.

The average molecular weight ($M_n$) of the flexibiliser (b2) is preferably comprised between 150 and 2000, preferably between 200 and 1500, more preferably between 300 and 750. Preferably it has a tail portion, which is free of isocyanate-reactive groups and which has a moleculer weight of at least 75, preferably of at least 150 and more preferably of at least 200.

According to an advantageous embodiment of the present invention, the at least one isocyanate-reactive component (B1) comprises the one or more chain-extenders and/or crosslinkers (b3) in an amount equal to or more than 1 part, preferably equal to or more than 2 parts, more preferably equal to or more than 3 parts, relative to 100 parts by weight of the isocyanate-reactive compounds (B1). On the other hand, the weight of chain-extenders and/or crosslinkers (b3), relative to 100 parts by weight of the isocyanate-reactive compounds (B1), is preferably equal to or less than 10 parts, more preferably equal to or less than 8 parts, even more preferably equal to or less than 6 parts.

The average molecular weight ($M_n$) of the chain-extenders and/or crosslinkers (b3) is preferably at most 250, more preferably at most 200.

Chain extenders are in general difunctional compounds and preferred chain-extenders (b3) are ethylene glycol, propanediol, butanediol, pentanediol, hexanediol, neopentyl glycol, ethylene diamine. Most preferred chain-extender (b3) is ethylene glycol.

Crosslinkers are compounds with a functionality of greater than 2. Preferred crosslinkers (b3) are glycerol, trimethylolpropane, sorbitol and the like. Crosslinkers will contribute to crosslinking while chain extenders will not.

According to an advantageous embodiment of the present invention, the at least one isocyanate-reactive component (B1) comprises the one or more amine-initiators (b4) in an amount equal to or more than 1 part, preferably equal to or more than 2 parts, more preferably equal to or more than 4 parts, relative to 100 parts by weight of the isocyanate-reactive compounds (B1). On the other hand, the weight of amine-initiators (b4), relative to 100 parts by weight of the isocyanate-reactive compounds (B1), is preferably equal to or less than 12 parts, more preferably equal to or less than 10 parts, even more preferably equal to or less than 8 parts.

Typical amine-initiators (b4) are notably described in U.S. Pat. Nos. 4,150,206 and 4,292,411, provided that a minimum functionality of 2 is required. Mention can notably be made of aliphatic or alicyclic alkanolamines or polyamines, having an amino group not directly attached to an aromatic ring. The number of NH— and/or NH2-groups is at least 2, if no OH-groups are present and, at least 1 if OH-groups are present. The total number of reactive groups, formed by NH, —NH2 or —OH, mostly varies between 2 and 5.

Preferred amine-initiators (b4) are crosslinking amine-initiators (b4) which have a functionality of at least 3 but less than or equal to 6. Non-limiting examples of such crosslinking amine-initiators are diisopropanolamine, 3-amino-1,2-propanediol, 2-amino-2-methyl-1,3-propanediol, 2-amino-2-ethyl-1,3-propanediol and diethanol amine. Most preferred crosslinking amine-initiators (b4) is diethanol amine (DEOA).

The Inventors have further surprisingly found that the elastomeric composite polyurethane skins of the present invention maintain good mechanical properties when the at least one isocyanate-reactive component (B1) comprises extender amine-initiators in an amount of less than 5.0 wt %, preferably less than 4.0 wt %, preferably less than 2.0 wt %, more preferably less than 1.5 wt %, of the first polyurethane reaction mixture wherein said extender amine-initiators have a functionality of 2 and a molecular weight of less than 300 and which correspond to formula (I):

$$HR^1N-R^2-OH \qquad (I)$$

wherein:
R[1] is H or a cyclic or acyclic hydrocarbon chain, which is substituted or not and which comprises one or more hetero-atoms or not, R1 being preferably H or a C1 to C6 alkyl group; and
R[2] is a cyclic or acyclic hydrocarbon chain which is substituted or not, which comprises one or more hetero-atoms, such as an O, S or N-atom, or not and which comprises a backbone linking the amino group with the hydroxyl group and containing at least two carbon atoms.

According to a preferred embodiment of the present invention, the at least one isocyanate-reactive component (B1) is substantially free of extender amine-initiators.

For the purpose of the present invention, the expression "substantially free of extender amine-initiators" means that the content of a extender amine-initiators, relative to the total weight of the first polyurethane reaction mixture, is lower than 1.0 wt %

Typical examples of extender amine-initiators notably include α,ω-aminohydroxy(alkylene oxide)n, n being from 2 to 7, in particular diglycolamine (DGA) and/or triglycolamine, and/or an aminoalcohol, in particular 2-aminoethanol (MEOA), 3-amino-2-propanol (IPA), 3-amino-1-propanol (3-APROP), 2-amino-1-propanol, 4-amino-1-butanol, 5-amino-1-pentanol (5-APENT), 6-amino-1-hexanol, 7-amino-1-heptanol, 2-amino-2-methyl-1-propanol (AMP), 2-amino-1-butanol (2-ABUT) and/or N-methylethanolamine (MEA).

As said, it is essential that the at least one catalyst component (C1) is substantially free of lead because of environmental regulations.

For the purpose of the present invention, the expression "substantially free of lead" means that the content of a lead, relative to the total weight of the first polyurethane reaction mixture, is lower than 100 ppm, in particular lower than 50 ppm, more specifically lower than 10 ppm.

It is known in the art that combinations of lead-free organometallic catalysts including specific organobismuth catalysts and organotin catalysts, optionally further in combination with organozinc catalysts are used as alternative catalyst systems to replace the lead catalyst in reactive PU formulations while still producing very flexible polyurethane skins and having a reduced emission of volatile compounds. This is notably described in WO 2004/000905, the whole content of which is herein incorporated by reference.

In WO 2007/137623 A1, and WO 2011/107605 A1, use is especially made of special organobismuth catalysts, in particular organobismuth (III) catalysts and/or organotin catalysts wherein the metal atom is bonded to longer chain organic groups such as notably a neodecanoate or an oleate group with the aim to reduce the emission of volatile compounds. Due to these longer chain organic groups, especially organobismuth catalysts, especially bismuth neodecanoate or bismuth oleate appears to give processing problems due to their lower compatibility when added in general in the polyol blend. It is further known that the organotin catalyst is mainly effective to provide for an effective curing at the end of the polymerisation reaction whilst the organobismuth catalyst provides for a quick initial curing.

The Inventors have now surprisingly found that the amount of organobismuth catalysts, in particular organobismuth (III) catalysts could be further reduced or even be omitted by replacing it completely by organotin catalysts. Due to the fact that a thin first aliphatic polyurethane layer can be applied and an accelerated curing is provided by applying an aromatic polyurethane reaction mixture onto the first aliphatic polyurethane layer, it is found that it is no longer necessary that a quick initial curing occurs as to avoid the running off of the first polyurethane reaction mixture on the surface of the mould under influence of the gravitation force. In this way, the emission of volatile organic compounds could be further reduced.

According to a preferred embodiment of the present invention, the at least one catalyst component (C1) in the first polyurethane reaction mixture comprises an organobismuth (III) catalyst in an amount lower than 0.5 parts, preferably lower than 0.4 parts, preferably lower than 0.3 parts, relative to 100 parts by weight of the isocyanate-reactive compounds (B1).

According to a more preferred embodiment, the first polyurethane reaction mixture is substantially free from an organobismuth (III) catalyst.

For the purpose of the present invention, the expression "from an organobismuth (III) catalyst" means that the content of the organobismuth (III) catalyst, relative to the total weight of the first polyurethane reaction mixture, is lower than 100 ppm, in particular lower than 50 ppm, more specifically lower than 10 ppm.

The Inventors have now found that in the absence of an organobismuth (III) catalyst, the at least one catalyst component (C1) in the first polyurethane reaction mixture preferably comprises or consist essentially of at least one organotin (II or IV) catalyst corresponding to the following formula (II):

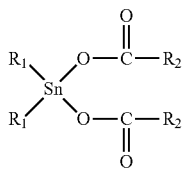

to the following formula (III):

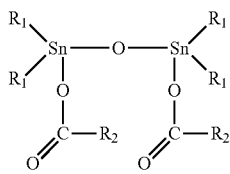

or to the following formula (IV)

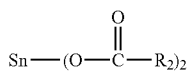

wherein: $R_1$ is a $C_1$-$C_8$ alkyl group; and
$R_2$ is either:
a linear or branched $C_7$-$C_{19}$ alkyl or alkenyl group, or
a linear or branched $C_1$-$C_{19}$ alkyl or alkenyl group, preferably a $C_7$-$C_{19}$ alkyl or alkenyl group, substituted with at least one isocyanate-reactive group, in particular with one or more OH—, NH— and/or NH2-groups.

Preferred organotin catalysts are selected from dialkyl tin dialkanoate catalyst such as notably dimethyltin dineodecanoate, dioctyltin dineodecanoate, dimethyltin dioleate and the like. Dimethyltin dioleate is especially preferred because of its higher activity and provides very short gel and tack-free times as well as good solubility in polyurethane systems.

If desired, said organotin (II or IV) catalysts, as described above, can be used in slightly higher amounts without increasing the emission of volatile organic compounds, in amounts ranging from 0.4 wt % to 2.0 wt %, preferably from 0.4 wt % to 1.5 wt %, more preferably from 0.8 wt % to 1.2 wt %, relative to the total weight of the first polyurethane reaction mixture.

The first polyurethane reaction mixture may further optionally comprise other ingredients such as a colorant such as notably a dye and/or a pigment, ultraviolet light stabilizers, heat stabilizers, pH stabilizers, antioxidants, an acid scavenger, processing aids, nucleating agents, an internal lubricant and/or an external lubricant, flame retardants, a smoke-suppressing agent, an anti-static agent, an anti-blocking agent, dulling agents, thixotropic agents (e. g., amorphous silica), fillers such as clay particles and/or conductivity additive such as carbon black and carbon nanofibrils. These fillers can, if necessary, substantially increase the density of the first aliphatic polyurethane layer.

When one or more other ingredients are present, their total weight, based on the total weight of first polyurethane reaction mixture, is usually below 30%, preferably below 20%, and more preferably below 10%.

As said, the second polyurethane reaction mixture comprises at least one aromatic isocyanate compound (A2), and at least one isocyanate-reactive component (B2).

Non-limiting examples of aromatic isocyanate compounds (A2) notably include diisocyanates having aromatic closed-ring structures, such as MDI-based isocyanates (e.g. diphenylmethane diisocyanate (MDI) and their mixtures, modified variants and prepolymers) and TDI-based isocyanates (e.g. toluene diisocyanate (TDI) and their mixtures, modified variants and prepolymers). Diphenylmethane diisocyanate prepolymer (MDI prepolymer) or diphenylmethane-4,4'-diisocyanate (MDI), or mixed isomers of MDI or mixtures of the above, are notably commercially available from BASF Elastogran (Lupranat), Dow Chemical Company (Isonate), Bayer (Desmodur), or Huntsman (Suprasec).

Preferred aromatic isocyanate compounds (A2) are MDI-based isocyanates, such as such as polymeric (crude) MDI, 'pure MDI', uretonimine-modified pure MDI or prepolymers based on MDI.

The at least one isocyanate-reactive component (B2) comprises mainly the same active hydrogen containing compounds (b1) and chain-extenders and/or crosslinkers (b3) as the active hydrogen containing compounds (b1) and chain-extenders and/or crosslinkers (b3) comprised in the at least one isocyanate-reactive component (B2), as detailed above.

It is further understood that all definitions and preferences as described for the active hydrogen containing compounds (b1) and chain-extenders and/or crosslinkers (b3) above equally apply for this embodiment and all further embodiments, as described below.

The Inventors have now found that the reduced average density of the second aromatic polyurethane layer, as detailed above, can be achieved when one or more chain extenders (b3) selected from the group consisting of propanediol, butanediol, pentanediol, and hexanediol, preferably butanediol were used in a slightly increased amount, in particular in an amount ranging from 4.5 parts to 15 parts, preferably from 5 parts to 12 parts, more preferably from 6 parts to 10 parts, relative to 100 parts by weight of the isocyanate-reactive compounds (B2).

Due to the specific properties of the aromatic isocyanate compounds (A2), as detailed above, it is generally not required that the second polyurethane reaction mixture further comprises a flexibiliser, an amine-initiator or any other ingredient.

If desired, the same catalyst components (C1), flexibilisers (b2), amine-initiators (b4) or other ingredients, as described above, can be comprised in the second polyurethane reaction mixture.

It is further understood that all definitions and preferences as described above for the catalyst components (C1), flexibilisers (b2), amine-initiators (b4) and other ingredients equally apply for this embodiment and all further embodiments, as described below.

The first and second polyurethane reaction mixtures are substantially solvent free or contain only a very limited solvent amount, in particular less than 5% (by weight) and preferably less than 3% (by weight).

The invention also pertains to a method for manufacturing the elastomeric composite polyurethane skin having an average flexural modulus, measured in accordance with ASTM D790-03, smaller than 35 MPa, as detailed above, wherein said method comprises the steps of:

Step 1. providing the first aliphatic polyurethane layer, as detailed above, made from the first polyurethane reaction mixture, as detailed above, Step 2. applying the second aromatic polyurethane layer, as detailed above, made from the second polyurethane reaction mixture, as detailed above, onto at least a portion of the first aliphatic polyurethane layer.

All definitions and preferences, as described above, equally apply here in this aspect of the present invention.

According to certain embodiments of the present invention, the first aliphatic polyurethane layer, as detailed above, made from the first polyurethane reaction mixture can be manufactured in Step 1. of the method by known processing techniques in the art, those including notably spraying techniques, as described in EP-B-0 303 305, EP-B-0 389 014 and EP-B-1 638 696, their descriptions are incorporated herein by way of reference and reaction injection moulding (RIM) techniques as disclosed in EP-B-0 386 818 and as notably disclosed in WO 98/14492, their descriptions are incorporated herein by way of reference.

According to certain embodiments of the present invention, the second aromatic polyurethane layer, as detailed above, made from the second polyurethane reaction mixture, as detailed above, can be applied onto at least a portion of the first aliphatic polyurethane layer by known processing techniques in the art, also those including notably spraying techniques, as described in EP-B-0 303 305, EP-B-0 389 014 and EP-B-1 638 696 and reaction injection moulding (RIM) techniques as disclosed in EP-B-0 386 818 and as notably disclosed in WO 98/14492.

According to a preferred embodiment of the present invention, the method for manufacturing the elastomeric composite polyurethane skin having an average flexural modulus, measured in accordance with ASTM D790-03, smaller than 35 MPa, as detailed above, comprises the following steps:

Step 1. spraying the first polyurethane reaction mixture, as detailed above, onto a mould surface, thereby forming the first aliphatic polyurethane layer, as detailed above, Step 2. spraying the second polyurethane reaction mixture, as detailed above, onto at least a portion of the first aliphatic polyurethane layer, thereby forming the second aromatic polyurethane layer, as detailed above, which adheres to the first aliphatic polyurethane layer, and Step 3. removing the composite polyurethane skin comprising the first aliphatic polyurethane layer and the second aromatic polyurethane layer from the mould surface after having allowed the first and the second polyurethane reaction mixtures to cure.

The spraying of the first and second polyurethane reaction mixtures in Step 1. and Step 2. of the method of the present invention is advantageously carried out by using spray guns with spray nozzles as notably disclosed in WO 2008/148419 and as notably disclosed in WO 2005/000481. This can be done by means of the same spray gun or by means of different spray guns, preferably by different spray guns.

The spraying of the first polyurethane reaction mixture in Step 1. is preferably carried out by using a spray gun with an airless spray nozzle as notably described in WO 2008/148419 which permits to spray the reaction mixture at very low flow rates.

The spraying of the second polyurethane reaction mixture in Step 2. is preferably carried out in the presence of a pressurized gas, in particular nitrogen gas, by using a spray gun as notably described in WO 2005/000481.

In general, the isocyanate components and the isocyanate-reactive component components are dosed from stirrer tanks, by means of two different pumps. Before being mixed in the spray gun, provided with a spray nozzle, said reaction components are heated to the desired temperature in heat exchangers.

The Inventors have found that by increasing the temperature of the first polyurethane reaction mixture in the spray nozzle that the reaction mixture, when being sprayed, has a reduced viscosity. This enables it to form the first aliphatic polyurethane layer having a uniform thin layer thickness, as defined in detail above, and having a reduced porosity. Porosity is one of the most critical surface issues in spray applications, and is mostly caused by entrapped air or moisture in the spray droplets, thereby forming pinholes. Porosity becomes more critical when spraying layers having very low thickness. Optimisation of the process parameters is required in order to keep the porosity at an acceptable level.

According to a preferred embodiment in Step 1. of the method of the present invention, the temperature of the first polyurethane reaction mixture in the spray nozzle is above 60° C., preferably above 70° C., more preferably above 75° C. Advantageously, the temperature of the first polyurethane reaction mixture in the spray nozzle is below 120° C., preferably below 110° C., more preferably below 90° C.

According to a preferred embodiment in Step 1. of the method of the present invention, the first polyurethane reaction mixture is sprayed out of the nozzle at a flow rate of between 1 and 20 g/sec, preferably at a flow rate of between 2 and 13 g/sec, and more preferably at a flow rate of between 5 and 10 g/sec.

According to a preferred embodiment in the method of the present invention, the mould surface is heated to accelerate the curing of the first and second polyurethane reaction mixtures, in particular to a temperature of between 30 and 100° C. and preferably to a temperature of between 60 and 65° C.

According to a preferred embodiment in Step 2. of the method of the present invention, spraying of the second polyurethane reaction mixture is started at the latest 90 seconds, preferably at the latest 60 seconds after having stopped spraying the first polyurethane reaction mixture.

As already mentioned above, the reduced average density of the second aromatic polyurethane layer, as detailed above, can be achieved by increasing the pressurized gas level, in particular nitrogen level ($N_2$), during the spraying of the second aromatic polyurethane layer of the elastomeric composite polyurethane skin, as detailed below.

The pressurized gas, in particular nitrogen gas, can be added to the second polyurethane reaction mixture after the mixing step so that it is sprayed in the form of a froth out of the nozzle or during the mixing step or prior to mixing the reaction mixture in the static mixer or alternatively by adding the pressurized gas to the isocyanate components and/or the isocyanate-reactive component components.

According to a preferred embodiment in Step 2. of the method of the present invention, the pressurised gas, in particular nitrogen gas, is supplied to the spray nozzle in an amount of at least 0.075 mmol per gram of the second polyurethane reaction mixture, preferably at least 0.15 mmol per gram of the second polyurethane reaction mixture, more preferably at least 0.30 mmol per gram of the second polyurethane reaction mixture, even more preferably at least 0.35 mmol per gram of the second polyurethane reaction mixture and the pressurised gas, in particular nitrogen gas, being preferably supplied to the spray nozzle in an amount of less than 1.5 mmol per gram of the second polyurethane reaction mixture, more preferably in an amount less than 1.1 mmol per gram of the second polyurethane reaction mixture and most preferably in an amount of less than 0.75 mmol per gram of the second polyurethane reaction mixture.

Before removing the composite polyurethane skin from the mould surface in Step 3. of the method, it is also possible to subject said composite polyurethane skin to a so-called direct backfoaming process. In such a process a polyurethane foam formulation is poured or otherwise applied onto the back of the second aromatic polyurethane layer and is allowed to foam between the skin and a rigid substrate so that the skin is adhered to the rigid substrate through this intermediate foam layer. This backfoam layer is preferably a semi-rigid foam layer so that it forms a sufficient solid cushion in front of the rigid substrate to provide some protection for the car driver and any passenger in case of crashes.

The invention also relates to the use of the elastomeric composite polyurethane skin according to the invention for the manufacture of shaped articles or at least parts thereof, such as notably automobile interior part applications, such as door panels, side panels, consoles, pillars, hatchback parcel shelves and dashboards, as well as non-automobile applications such as furniture, including chairs.

Said shaped articles or at least parts thereof, are also an aspect of the present invention.

Examples

The invention will be now described in more details with reference to the following examples, whose purpose is merely illustrative and not intended to limit the scope of the invention.

All contents in these examples are given in weight parts, unless stated otherwise.

The following raw materials have been used in the examples:

P11: glycerol initiated polyalkylene oxide (EO, PO) having an equivalent weight of about 1600 and a primary OH content of 85%
MEG: monoethylene glycol
DEOA: diethanolamine
DGA: diglycolamine
AO: mixture of antioxidantia
CP: colour paste
BK: organic Bi catalyst
TP28: isophorondiisocyanate (IPDI) trimer dissolved in IPDI (28% NCO)
P500: methoxy-polyethyleneglycol having a molecular weight of about 500
TK500: organotin catalyst
BDO: 1,4-butanediol
Suprasec 2029: uretonimine-modified pure MDI (24.1% NCO)
ADD: additive package comprising a stabiliser, a water scavenger
CAT: mixture of an organic Bi and an organic Sn catalyst Test Methods
Density (kg/m$^3$): 1501183-1 (05-2012)
Flexural Modulus (MPa): ASTM D790-I B (04-2010)
Tensile strength (N/mm2): NBN EN ISO 527 3/2/100 (08-1995)
Tear Resistance (N/cm): ISO 34-1-B (b) (06-2015)

TABLE 1

| Formulations of examples 1 and 2, and of the comparative example 1 | | | | |
|---|---|---|---|---|
| | | Comp. Ex. 1 | Example 1 | Example 2 |
| first aliphatic PU layer | | | | |
| formulation | P11 | 76 | 86 | 76 |
| | MEG | 4 | 4 | 4 |
| | DGA | 0 | 1.5 | 0 |
| | DEOA | 6 | 5 | 6 |
| | CP | 10 | 10 | 10 |
| | AO | 1.0 | 1.0 | 1.2 |
| | ADD | 6.3 | 6.3 | 6.3 |
| | BK | 0.35 | 0.35 | 0 |
| | TP28 | 58 | 58 | 58 |
| | P500 | 0 | 5 | 5 |
| | TK500 | 0.7 | 0.7 | 2 |

TABLE 1-continued

Formulations of examples 1 and 2, and of the comparative example 1

|  |  | Comp. Ex. 1 | Example 1 | Example 2 |
|---|---|---|---|---|
| average thickness |  | 0.5 mm | 0.5 mm | 0.35 mm |
| average density |  | 1000 kg/m³ | 1000 kg/m³ | 1000 kg/m³ |
| average areal weight |  | 500 g/m² | 500 g/m² | 350 g/m² |
| second aromatic PU layer |  |  |  |  |
| formulation | P11 | 80 | 80 | 80 |
|  | BDO | 0 | 5 | 7 |
|  | MEG | 8 | 8 | 8 |
|  | CAT | 0.12 | 0.12 | 0.12 |
|  | ADD | 6.3 | 6.3 | 6.3 |
|  | Suprasec 2029 | 56 | 77 | 86 |
| average thickness |  | 0.5 mm | 0.5 mm | 0.65 mm |
| average density |  | 1000 kg/m³ | 500 kg/m³ | 400 kg/m³ |
| average areal weight |  | 500 g/m² | 250 g/m² | 260 g/m² |

TABLE 2

Processing parameters

|  | Comp. Ex. 1 | Example 1 | Example 2 |
|---|---|---|---|
| Temperature of aliphatic PU in spray nozzle | 65° C. | 65° C. | 80° C. |
| Spray flow rate of the aliphatic PU mixture | 13-14 g/s | 13-14 g/s | 10-11 g/s |
| N2 dosage in aromatic layer | 0 | 0.34 mmol per g of aromatic PU mixture | 0.43 mmol per g of aromatic PU mixture |

TABLE 3 properties of the composite skin obtained from the formulations of Table 1

|  | Comp. Ex. 1 | Example 1 | Example 2 |
|---|---|---|---|
| average thickness | 1 mm | 1 mm | 1 mm |
| average areal weight | 1000 g/m² | 750 g/m² | 610 g/m² |
| tensile strength | 5N/mm² | 3.6N/mm² | 3.5N/mm² |
| tear resistance | 15N/m | 10N/m | 10N/m |
| flexural modulus | 35 MPa | 25 MPa | 20 MPa |

These results show that the average areal weight of the composite skins according to the invention could be significantly reduced whilst still keeping sufficiently high values for the mechanical properties (tensile strength, tear resistance, flexural modulus) thereof.

In example 1 the density of the aromatic PU layer was decreased by half by using $N_2$ gas at a dosage of 0.34 mmol/gPU. In example 2, the density of the aromatic layer was still further decreased by using a still higher $N_2$ gas dosage. By using an increased content of BDO, the mechanical properties of the composite skin could be maintained at the required level. Additionally, the aliphatic PU layer could be applied in a much thinner layer by increasing the temperature of the PU reaction mixture in the nozzle. Surprisingly, this thinner aliphatic PU top layer in combination with a thicker but lighter aromatic layer, rendered PU composite skins with a substantial decrease in weight, whilst having a very high flexibility and keeping the required mechanical properties. Despite the very low thickness of the aliphatic PU top layer, the porosity was not negatively affected, this means the obtained skins still have the required level of surface quality, i.e. no surface defects.

The invention claimed is:

1. An elastomeric composite polyurethane skin having an average flexural modulus, measured in accordance with ASTM D790-03, smaller than 35 MPa; said elastomeric composite polyurethane skins comprising:

a first sprayed aliphatic polyurethane layer made from a first polyurethane reaction mixture wherein said first polyurethane reaction mixture comprises at least one isocyanate compound (A1) having at least two NCO-groups which are not directly attached to an aromatic group, at least one isocyanate-reactive component (B1) and at least one catalyst component (C1) wherein the catalyst component (C1) comprises lead in a content lower than 100 ppm, relative to the total weight of the first polyurethane reaction mixture, and a second sprayed aromatic polyurethane layer made from a second polyurethane reaction mixture wherein said second polyurethane reaction mixture comprises at least one aromatic isocyanate compound (A2), and at least one isocyanate-reactive component (B2), wherein the elastomeric composite polyurethane skin has an average areal weight of equal to or less than 750 g/m² and the second aromatic polyurethane layer has a second average areal weight of less than 300 g/m², and wherein the first sprayed aliphatic polyurethane layer and the second sprayed aromatic polyurethane layer are formed by spraying the first polyurethane reaction mixture and the second polyurethane reaction mixture, respectively.

2. The elastomeric composite polyurethane skin according to claim 1, wherein the elastomeric composite polyurethane skin has an average areal weight of equal to or less than 700 g/m².

3. The elastomeric composite polyurethane skin according to claim 1, wherein the second aromatic polyurethane layer has a second average areal weight of less than 270 g/m².

4. The elastomeric composite polyurethane skin according to claim 1, wherein the average density of the second aromatic polyurethane layer skin is equal to or less than 550 kg/m³.

5. The elastomeric composite polyurethane skin according to claim 1, wherein the first aliphatic polyurethane layer has an average density of at least 600 kg/m³.

6. The elastomeric composite polyurethane skin according to claim 1, wherein the first aliphatic polyurethane layer has an average thickness of equal to or less than 0.50 mm.

7. The elastomeric composite polyurethane skin according to claim 1, wherein the at least one isocyanate-reactive component (B1) comprises:
- (b1) one or more active hydrogen containing compounds having: functional groups comprising hydroxyl, amine, or thiol groups;
  a nominal functionality of from 2 to 8 and an equivalent weight of between 200 and 4000;
- (b2) optionally, one or more active hydrogen containing flexibilisers which reduce the flexural modulus of the first aliphatic polyurethane layer, which have a molecular weight between 76 and 5000 and which contain only one isocyanate-reactive group which will react with an isocyanate group of the isocyanate compound (A1);
- (b3) one or more chain-extenders or crosslinkers having only hydroxyl groups as functional groups, at least 50% of which are primary hydroxyl groups, a functionality from 2 to 6; and
- (b4) one or more amine-initiators which form a co-catalytic system with catalyst component (C1), which have a functionality of 2 to 6 and an equivalent weight lower or equal to 200 and which comprise at least one aliphatic or alicyclic $NH_2$— or NH— group.

8. The elastomeric composite polyurethane skin according to claim 7, wherein the one or more flexibilisers (b2) are comprised in the at least one isocyanate-reactive component (B1) in an amount equal to or more than 1 part and the one or more flexibilisers (b2) are comprised in the at least one isocyanate-reactive component (B1) in an amount preferably equal to or less than 15 parts relative to 100 parts by weight of the isocyanate-reactive compounds (B1).

9. The elastomeric composite polyurethane skin according to claim 7, wherein the amine-initiators (b4) are crosslinking amine-initiators (b4) which have a functionality of at least 3 but less than or equal to 6.

10. The elastomeric composite polyurethane skin according to claim 7, wherein the at least one isocyanate-reactive component (B1) comprises extender amine-initiators in an amount of less than 5.0 wt %, relative to the total weight of the first polyurethane reaction mixture wherein said extender amine-initiators have a functionality of 2 and a molecular weight of less than 300 and which correspond to formula (I):

$$HR^1N—R^2—OH \quad (I)$$

wherein:
- $R^1$ is H or a cyclic or acyclic hydrocarbon chain, which is substituted or not and which comprises one or more hetero-atoms or not, and
- $R^2$ is a cyclic or acyclic hydrocarbon chain which is substituted or not, which comprises one or more heteroatoms selected from O, S or N-atom and which comprises a backbone linking the amino group with the hydroxyl group and containing at least two carbon atoms.

11. The elastomeric composite polyurethane skin according to claim 1, wherein the at least one catalyst component (C1) in the first polyurethane reaction mixture comprises an organobismuth (III) catalyst in an amount lower than 0.5 parts, relative to relative to 100 parts by weight of the isocyanate-reactive compounds (B1).

12. The elastomeric composite polyurethane skin according to claim 11, wherein the at least one catalyst component (C1) in the first polyurethane reaction mixture comprises or consists essentially of at least one organotin (II or IV) catalyst corresponding to the following formula (II):

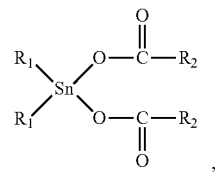

to the following formula (III):

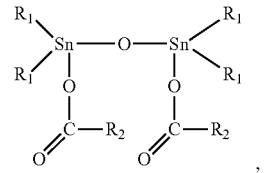

or to the following formula (IV)

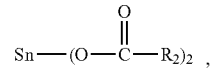

wherein:
- $R_1$ is a $C_1$-$C_8$ alkyl group; and
- $R_2$ is either: a linear or branched $C_7$-$C_{19}$ alkyl or alkenyl group, or
  a linear or branched $C_1$-$C_{19}$ alkyl or alkenyl group substituted with at least one isocyanate-reactive group selected from one or more OH—, NH—, and $NH_2$- groups.

13. The elastomeric composite polyurethane skin according to claim 1, wherein the at least one isocyanate-reactive component (B2) comprises:
- (b1) one or more active hydrogen containing compounds having: functional groups comprising hydroxyl, amine, or thiol groups;
  a nominal functionality of from 2 to 8 and an equivalent weight of between 200 and 4000; and
- (b3) one or more chain-extenders or crosslinkers having only hydroxyl groups as functional groups, at least 50% of which are primary hydroxyl groups, and a functionality from 2 to 6.

14. The elastomeric composite polyurethane skin according to claim 13, wherein the chain-extender (b3) is selected from the group consisting of propanediol, butanediol, pentanediol, and hexanediol and is present in an amount ranging from 4.5 parts to 15 parts relative to 100 parts by weight of the isocyanate-reactive compounds (B2).

15. Shaped articles or at least parts thereof comprising the elastomeric composite polyurethane skin having an average flexural modulus, measured in accordance with ASTM D790-03, smaller than 35 MPa, according to claim 1.

16. A method for manufacturing the elastomeric composite polyurethane skin having an average flexural modulus, measured in accordance with ASTM D790-03, smaller than 35 MPa, according to claim 1, wherein the method comprises the steps of:
  spraying a first polyurethane reaction mixture onto a mould surface by using a spray gun with a spray nozzle, thereby forming a first aliphatic polyurethane layer, preferably the spraying is carried out by using a spray gun with an airless spray nozzle, wherein the temperature of said first polyurethane reaction mixture in the spray nozzle is above 60° C. and wherein said first polyurethane reaction mixture is sprayed out of the nozzle at a flow rate of between 1 and 20 g/sec;

spraying a second polyurethane reaction mixture onto at least a portion of the first aliphatic polyurethane layer, thereby forming a second aromatic polyurethane layer, which adheres to the first aliphatic polyurethane layer, wherein said spraying is carried out in the presence of a pressurized gas, and the pressurized gas is supplied to the spray nozzle in an amount of at least 0.075 mmol per gram of the second polyurethane reaction mixture and less than 1.5 mmol per gram of the second polyurethane reaction mixture; and removing the composite polyurethane skin comprising the first aliphatic polyurethane layer and the second aromatic polyurethane layer from the mould surface after having allowed the first and the second polyurethane reaction mixtures to cure.

17. The method of claim 16, wherein the pressurized gas is nitrogen gas.

\* \* \* \* \*

UNITED STATES PATENT AND TRADEMARK OFFICE
CERTIFICATE OF CORRECTION

PATENT NO. : 11,472,934 B2
APPLICATION NO. : 16/491527
DATED : October 18, 2022
INVENTOR(S) : Bouckaert et al.

Page 1 of 1

It is certified that error appears in the above-identified patent and that said Letters Patent is hereby corrected as shown below:

In the Claims

| Column | Line | |
|--------|------|--|
| 17 | 4 | change "b 1" to -- b1 --. |
| 17 | 61 | change "relative to relative to" to -- relative to --. |
| 17 | 62 | change "B 1" to -- B1 --. |
| 18 | 40 | change "b 1" to -- b1 --. |

Signed and Sealed this
Fourth Day of July, 2023

Katherine Kelly Vidal
*Director of the United States Patent and Trademark Office*